Dec. 10, 1963

I. A. ABERNETHY ETAL 3,113,900

METHOD FOR MANUFACTURING PREGROUTED MOSAIC TILE ASSEMBLIES

Filed June 3, 1960

INVENTOR
Ira A. Abernethy,
STEPHEN J. CABLE
CHARLES F. FISHLEY
BY Diggins & LeBlanc
ATTORNEYS

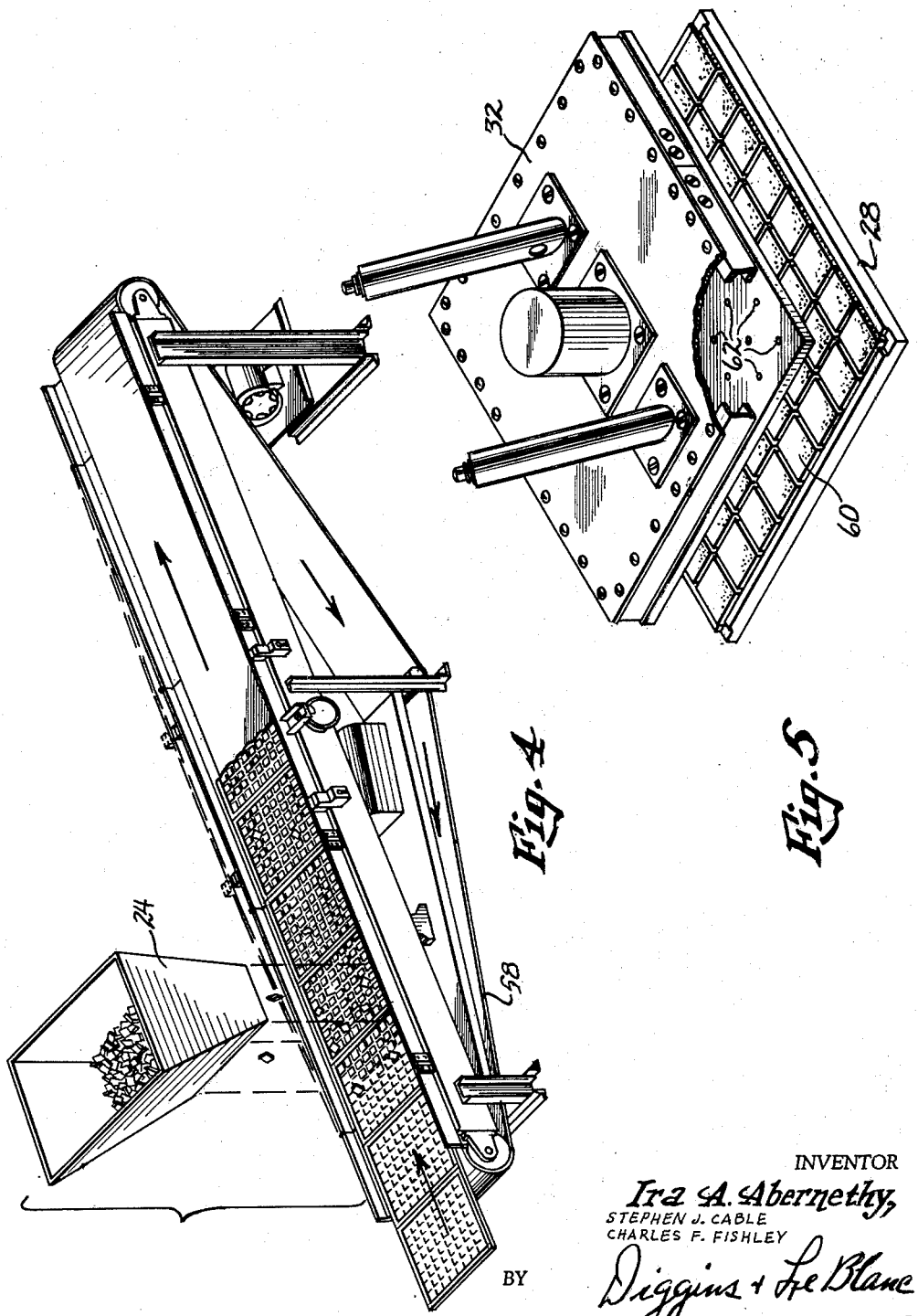

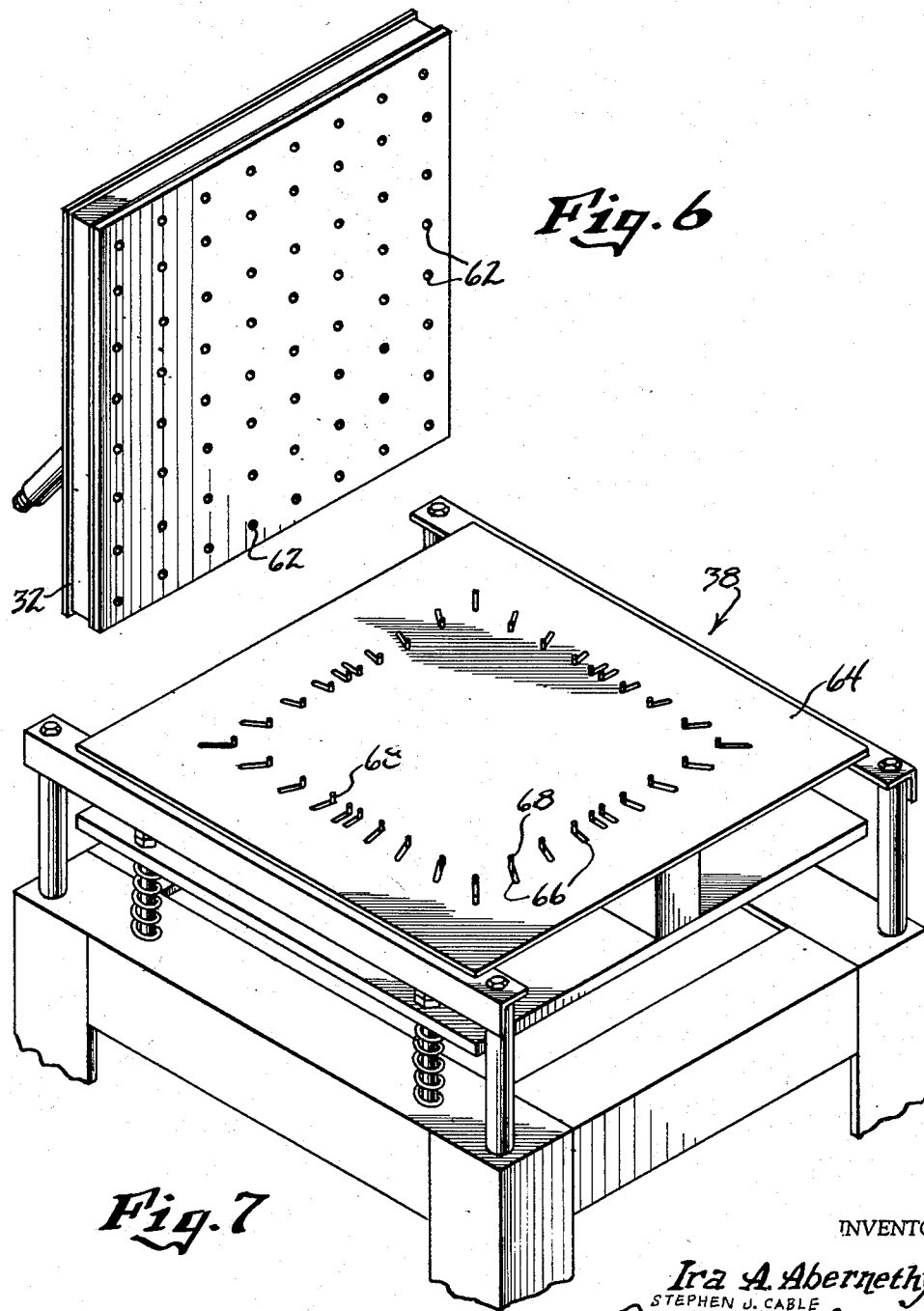

Dec. 10, 1963

I. A. ABERNETHY ETAL 3,113,900

METHOD FOR MANUFACTURING PREGROUTED
MOSAIC TILE ASSEMBLIES

Filed June 3, 1960

INVENTOR
Ira A. Abernethy,
STEPHEN J. CABLE
CHARLES F. FISHLEY

ATTORNEYS

United States Patent Office 3,113,900
Patented Dec. 10, 1963

3,113,900
METHOD FOR MANUFACTURING PREGROUTED MOSAIC TILE ASSEMBLIES
Ira A. Abernethy and Stephen J. Cable, Canton, and Charles F. Fishley, Mineral City, Ohio, assignors to United States Ceramic Tile Company, Canton, Ohio, a corporation of Delaware
Filed June 3, 1960, Ser. No. 33,663
5 Claims. (Cl. 156—299)

The present invention relates to a method for manufacturing pregrouted mosaic ceramic tile assemblies of the type generally shown in Letters Patent No. 2,852,932 and more particularly as shown in my copending application Serial No. 31,299, filed May 24, 1960.

As pointed out in United States Letters Patent No. 2,852,932, pregrouted ceramic tile assemblies result in very substantial savings of time and expense in the installation of ceramic tiles and also provide a more pleasing and uniform appearance in the finished unit. In order to further reduce the cost of ceramic tile installation, it is a principal object of the present invention to provide a method and apparatus for automatically producing pregrouted ceramic tile assemblies ready for shipment and installation.

It is another object of the present invention to provide a method for positioning individual ceramic tile units in a preformed grouting lattice. It is another object of the present invention to provide a method for producing pregrouted ceramic tile assemblies with a minimum of expense.

These and other objects and advantages reside in novel features of construction, arrangement and combination of parts and in steps and processes as will hereinafter be more fully set forth and pointed out in the appended claims.

Referring to the drawings, FIGURE 1 is a diagrammatic flow sheet illustrating the process and apparatus of the present invention;

FIGURE 4 is a perspective view of the apparatus for positioning the individual loose ceramic tile units in a jig or template of FIGURE 2;

FIGURE 5 is a perspective view of the mechanism for transferring the tile units from the jig to the pregrout lattice;

FIGURE 6 is a perspective view of the vacuum transfer head;

FIGURE 7 is a perspective view of the apparatus for stretching and positioning the pregrout lattice;

Figure 1:
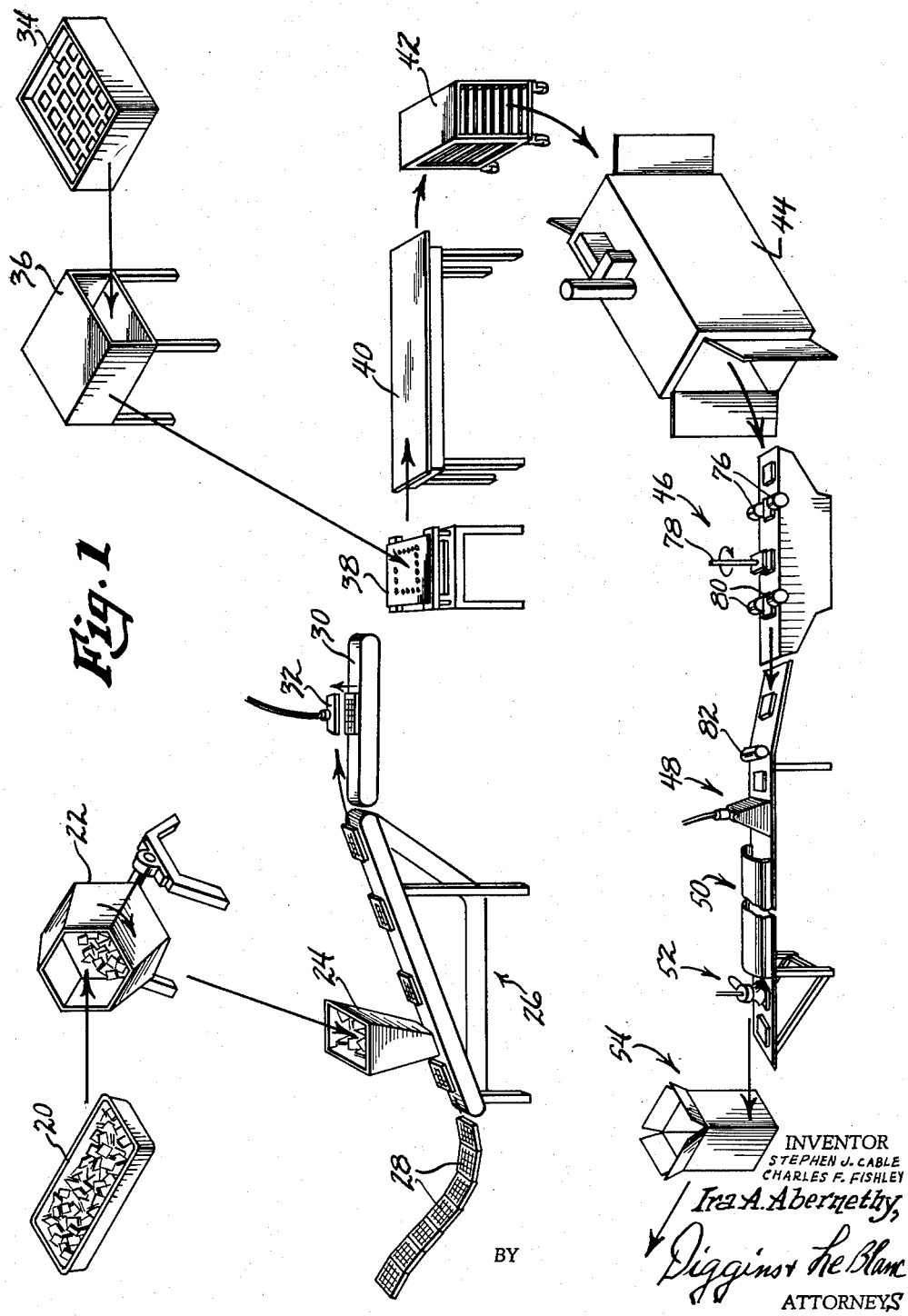

The over-all operation of the process and apparatus can be best understood with reference to the flow sheet of FIGURE 1 and the invention is illustrated in connection with the formation of pregrouted units of one inch by one inch mosaic tile.

Bulk tile from trays 20 are placed in a tile blender 22 and from the tile blender the loose tiles are placed in the hopper 24 of an automatic orienter indicated generally at 26. Templates or jigs 28 are fed along the orienter 26 and are agitated so that the individual loose ceramic tiles fit into and fill the individual tile compartments of the jigs. The filled templates are then fed onto a table 30 and a vacuum head 32 picks up the oriented tile from the template.

In the meanwhile, a lattice 34 of suitable material such as vinyl, or natural or synthetic rubber or the like, has been coated with an adhesive in an applicator 36 and the lattice is then placed upon a table 38 where the lattice is held and stretched so that the openings are larger than the individual tiles. The vacuum head 32 then deposits the tiles in the individual pockets of the grouting lattice. The grouting lattice is then released to return to its original size which is approximately the size of the individual tiles and the completed pregrouted unit is then cleaned on table 40 to remove excess adhesive. Trucks 42 of these finished pregrouted units are then placed in curing ovens 44 to cure and harden the cement or other adhesive.

After the cement has been cured, the outer edges of the grouting lattices are ground to precise dimensions as indicated generally at 46. The finished unit is then treated with a proper sealant as indicated at 48. The unit is dried at 50, polished at 52, and is then ready for final inspection and shipment as indicated at 54.

From the foregoing brief description it is apparent that the production of pregrouted tile units may be accomplished at high speed and on a continuous basis with a minimum of hand labor.

Figure 2:
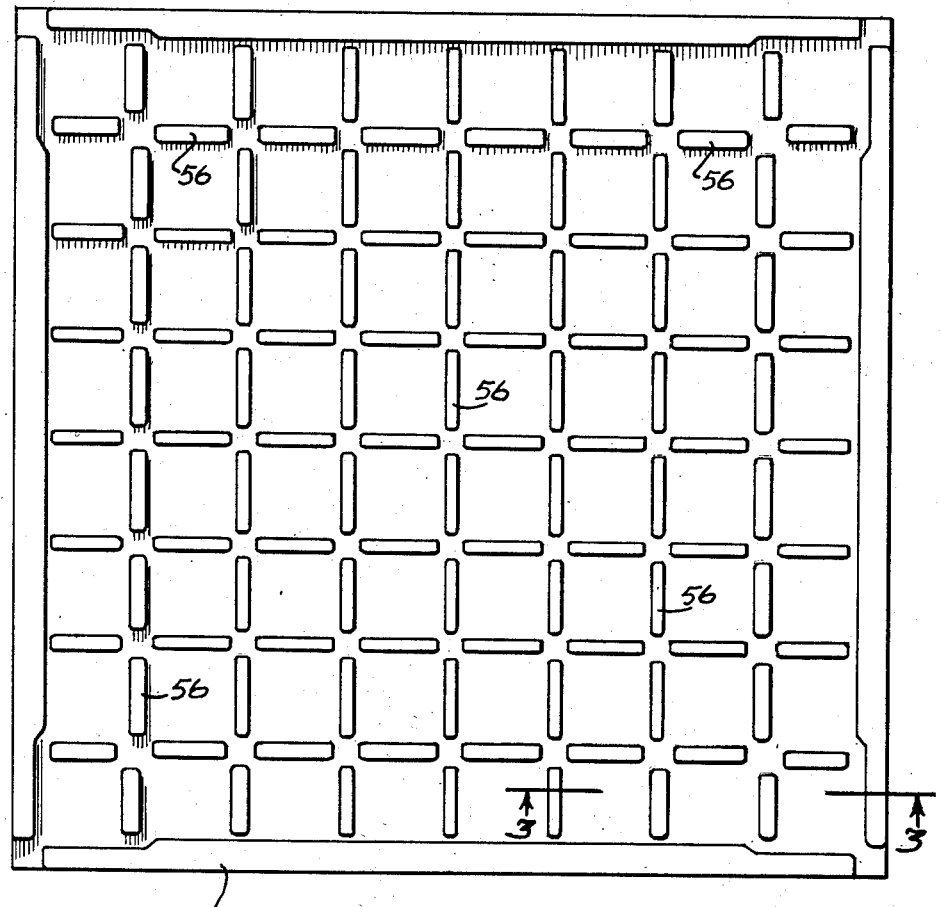
FIGURE 2 is a top plan view of a jig or template for positioning loose ceramic tiles.
Figure 3:
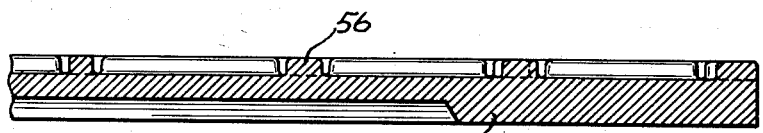
FIGURE 3 is a section taken on line 3—3 of FIGURE 2.

The present invention is illustrated in connection with the production of pregrouted ceramic tile assemblies of one inch by one inch tile units and a suitable and convenient size for such pregrouted assemblies is 8 x 8 tiles per assembly so that the over-all dimension of the finished pregrouted assembly will be 9 x 9 inches. FIGURES 2 and 3 show a template or jig for positioning the loose individual tile units, and as shown in FIGURE 2, the jig or template has 64 pockets, each pocket being slightly larger than a 1 x 1 inch tile so that the tiles will drop readily into position into these pockets and may be readily removed. The pockets in the jig are shaped and positioned to conform to the stretched lattice as will hereafter be described. The template or jig may be of any suitable material such as cast aluminum and the walls 56 forming the boundaries of the individual pockets are preferably not quite as high as the individual tiles are thick.

Referring now to FIGURE 4, empty templates or jig plates are fed beneath the hopper 24 on a moving conveyor belt 58. These templates are fed up a slight incline and are agitated during passage so that the individual tiles will fill the pockets of the template. A template or jig plate 28 filled with individual tiles 60 is shown in FIGURE 5.

After the template or jig plate is filled with tile, it is fed to the table or support 30 and the vacuum head 32 is brought down into contact with the tiles. This vacuum head, as indicated in FIGURE 5, is hollow and is provided with a series of apertures 62 in its lower face, at least one aperture 62 for each tile in the template. When the hollow vacuum head 32 is subjected to a vacuum, the individual tile units 60 are picked up in their prearranged pattern from the jig plate. The perforated surface of the vacuum head preferably has a soft tile contacting surface of rubber or the like backed by a metal plate.

The details of construction of the pregrouted unit to which the present invention pertains is described and claimed in my copending application entitled "Pregrouted Tile Assemblies" and individual pregrouting lattices 34 are placed in a suitable adhesive applicator or spray hood 36 where the interior of the pockets of the grouting lattice are coated with an adhesive such as an epoxy resin suitable for securing the ceramic tiles to the plastic lattice.

Figure 8:
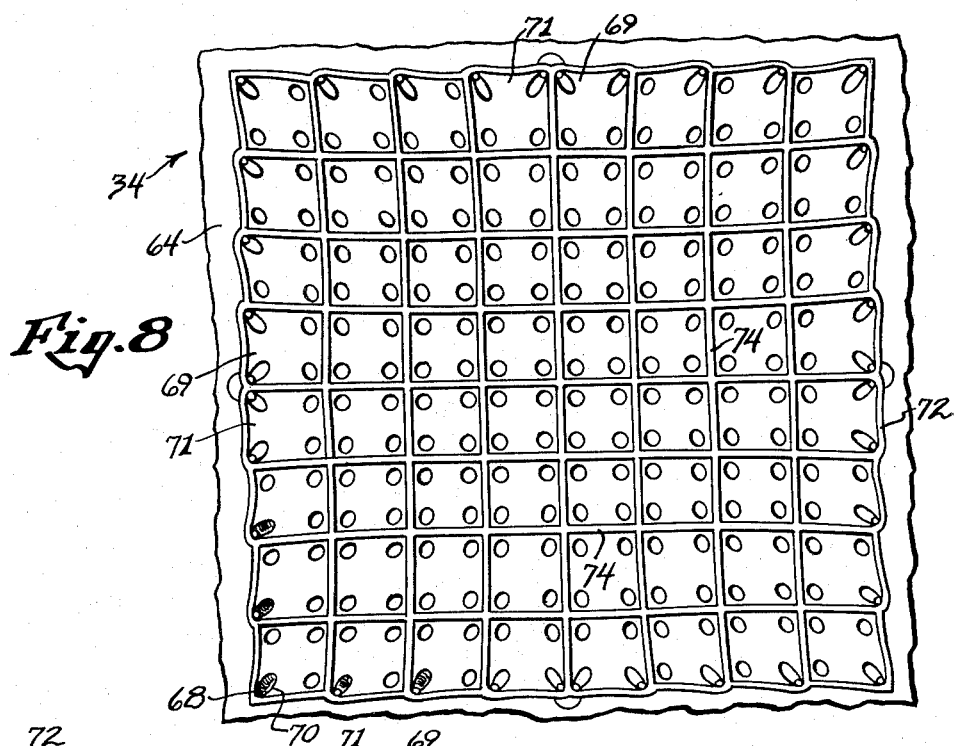
FIGURE 8 is a plan view of the empty pregrout lattice positioned on the mechanism of FIGURE 7.
Figure 9:
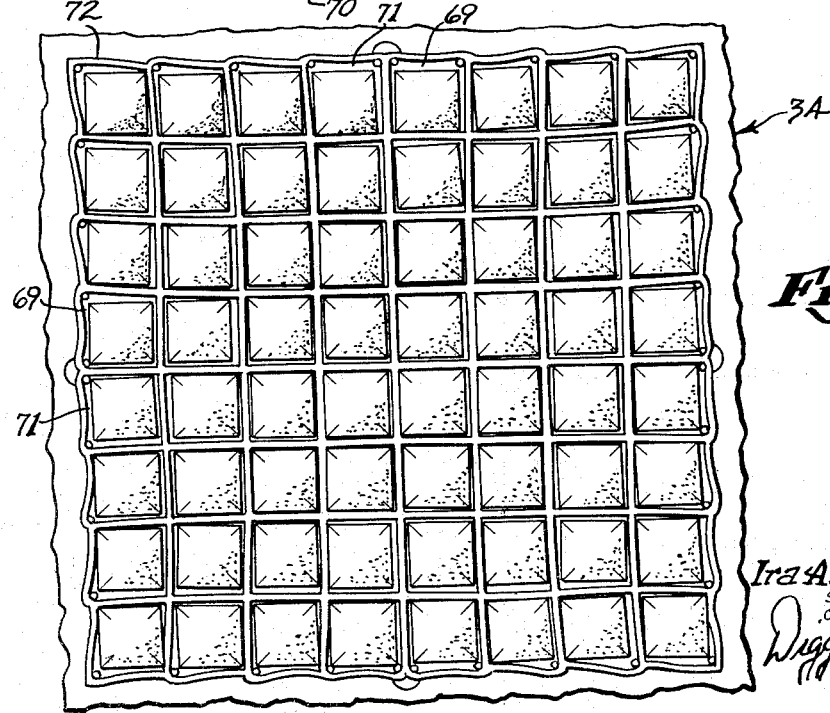
FIGURE 9 is a plan view similar to FIGURE 8 with the tile units in place in the lattice.

After the lattice has been coated with adhesive, it is placed upon the stretching and positioning mechanism 38 which is best shown in FIGURE 7. This stretching and positioning mechanism has a substantially flat cover plate 64 provided with a plurality of radial slots 66 and a pin 68 projects above the surface 64 through each of these slots. The lattice 34 as shown in FIGURE 8 is placed on the surface 64 so that a pin 68 projects through an opening 70 in each of the peripheral pockets of the lattice. As shown in FIGURES 8 and 9, two pins 68 project through openings 70 in each of the two peripheral pockets 69 and 71 at the center of each side of the lattice.

These pins 68 are then moved radially outward by a suitable mechanism (not shown), thus stretching the pockets on the lattice so that they are larger than the individual tile units. The vacuum head 32 having picked up a complete set of oriented tile units in their prearranged pattern from a template or jig plate 28, deposits the individual tile units in each of the stretched pockets of the grouting lattice as shown in FIGURE 9. The stretching of the pockets precludes any squeegee action which might otherwise remove adhesive from the side walls of the pockets.

The pins 68 are then withdrawn below the surface 64 and the lattice is permitted to return to its original size. This causes the lattice not only to grip the tiles, due to its elastic character, but also forces the still plastic adhesive into all corners of the pockets, thus insuring a tight and waterproof bond between the tile and the grouting lattice. The pregrouted tile assembly is then moved to a table or conveyor 40 where excess adhesive may be removed from the face of the assembly before curing.

Of course, various other means could be used to stretch the elastic lattice. For example, the outer edges of the lattice could be provided with flanges which could be gripped by clamps.

After any excess adhesive has been removed, the pregrouted tile assembly is placed in a curing oven 44 where the adhesive is cured or vulcanized.

As pointed out in my copending application referred to above, and as shown in FIGURES 8 and 9 of the present drawings, the outer peripheral edge wall 72 of the pregrout lattice is of equal or greater width than the inner walls 74. This accomplishes two results: first, it provides greater strength during the stretching operation, and secondly, it permits the over-all pregrouted unit to be formed to precise shape regardless of any variation in tile sizes.

After leaving the curing oven 44, after the adhesive has been entirely cured, the pregrouted tile assembly is passed between two precisely spaced cutting or grinding units 76 which form the edge of the unit to desired shape or configuration, and also to precise predetermined dimensions. A jig or fixture 78 then turns the ground unit through precisely 90 degrees and the other two edges are formed to precise shape and dimension by another pair of cutting and grinding units 80.

After the edges of the pregrout unit have been formed to accurate size and configuration, the pregrouted tile assembly passes through a back treating operation indicated at 82.

During the process, some of the adhesive may remain on the back of the pregrout lattice and at the back-treating station 82, the back surface of the unit is treated with a wire brush or other abrasive so as to remove any adhesive and also to roughen the back surface of the lattice to facilitate application to the surface to be tiled.

From the back-treating station the pregrout assembly passes beneath the hood 48 where a sealant is applied to the tile surfaces. Such sealants are widely known and commonly used in the trade, and serve to close the pores of the tile and reduce water absorption.

The unit then passes through the curing oven 50 where the sealant is dried or cured, and then the unit passes to a buffer 52 where the tile surfaces are buffed and polished. The unit is now complete and ready for shipment in a carton 54.

From the foregoing, it will be apparent that the objects of the invention have been obtained, and that a new process and apparatus provided for the continuous high speed production of pregrouted tile units. It is also apparent that these units are produced with a minimum of hand labor, and that the resulting units are accurate in size, have the tiles permanently secured therein, and are ready for application with a minimum of labor for such application. Of course, various modifications can be made without departing from the spirit of the invention or the scope of the appended claims.

We claim:
1. A method of forming a pregrouted mosaic tile assembly comprising:
 (a) depositing a plurality of loose tile units in a jig having plurality of individual compartments corresponding in size to said tile units;
 (b) arranging each tile unit in a compartment of said jig;
 (c) outwardly stretching the periphery of a resilient grouting lattice having a plurality of pockets equal in number and similarly arranged to the jig compartments;
 (d) removing the tile units in their prearranged pattern from the jig;
 (e) positioning said tile units above the stretched lattice so that each tile unit overlies a pocket of the lattice;
 (f) depositing each tile unit in each of said pockets; and
 (g) releasing the periphery of the lattice to allow the lattice pockets to return to their original shape so as to form a pregrouted mosaic tile assembly.

2. The method recited in claim 1, wherein step (b) includes agitating the jig to cause the tile units to position themselves in the compartments.

3. The method recited in claim 1, wherein step (c) includes placing the lattice on stretching means having a plurality of stretching elements; and projecting the elements through the periphery of the lattice in an outward direction.

4. The method recited on claim 1, including an additional step, prior to step (c), of applying an adhesive to the lattice pockets so as to secure the tile units within the lattice.

5. A method of forming a pregrouted mosaic tile assembly comprising:
 (a) depositing a plurality of loose tile units in a jig having a plurality of individual compartments corresponding in size to said tile units;
 (b) arranging each tile unit in a compartment of said jig;
 (c) outwardly stretching the periphery of a resilient grouting lattice having a plurality of pockets equal in number and similarly arranged to the jig compartments;
 (d) positioning vacuum means over the jig;
 (e) drawing the tile units in their prearranged pattern from the jig;
 (f) positioning the vacum means over the stretched lattice so that each tile unit overlies a pocket of the lattice;
 (g) withdrawing the vacuum so as to deposit each tile unit in each of said pockets; and
 (h) releasing the periphery of the lattice to allow the lattice pockets to return to their original shape so as to form a pregrouted tile assembly.

References Cited in the file of this patent

UNITED STATES PATENTS

| | | |
|---|---|---|
| 557,785 | Eisenhardt et al. | Apr. 7, 1896 |
| 757,759 | Maidhof | Apr. 19, 1904 |
| 1,311,653 | Koep | July 29, 1919 |
| 1,587,248 | Spence | June 1, 1926 |
| 1,813,901 | Bayne | July 14, 1931 |
| 1,857,856 | Medina | May 10, 1932 |
| 1,961,613 | Lessing | June 5, 1934 |
| 2,709,864 | Gulbrandsen | June 7, 1955 |
| 2,852,932 | Cable | Sept. 23, 1958 |
| 2,855,653 | Kastenbein | Oct. 14, 1958 |